United States Patent
Itakura et al.

(10) Patent No.: US 6,624,234 B1
(45) Date of Patent: Sep. 23, 2003

(54) AQUEOUS COATING COMPOSITION FOR AUTOMOTIVE UPHOLSTERY

(75) Inventors: Tatsuya Itakura, Wako (JP); Sukekuni Itoh, Wako (JP); Takashi Watanabe, Hirakata (JP); Yukiko Ishimoda, Hirakata (JP); Shinnosuke Kawano, Hirakata (JP)

(73) Assignees: Honda Giken Kyogo Kabushiki Kaisha, Tokyo (JP); Nippon Bee Chemical Co., Ltd., Osaka (JP)

( * ) Notice: Subject to any disclaimer, the term of this patent is extended or adjusted under 35 U.S.C. 154(b) by 0 days.

(21) Appl. No.: 09/591,742

(22) Filed: Jun. 12, 2000

(30) Foreign Application Priority Data

Jun. 22, 1999 (JP) ............................................ 11-176052

(51) Int. Cl.$^7$ ...................... C08L 33/02; C08L 33/08; C08L 33/10; C08L 27/04; C08L 27/06; C08L 27/22; C08F 14/02; C08F 14/06

(52) U.S. Cl. .................. 524/501; 524/519; 524/523; 524/527; 525/221; 525/222; 525/239; 525/214; 525/330.7

(58) Field of Search ................... 524/501, 519, 524/523, 524, 527, 556, 567; 525/222, 239, 221, 330.7, 214, 285, 317, 78, 80

(56) References Cited

U.S. PATENT DOCUMENTS

| 4,007,147 | A | * | 2/1977 | Leeson et al. | 523/221 |
|---|---|---|---|---|---|
| 4,252,852 | A | * | 2/1981 | Goth | 428/336 |
| 4,619,960 | A | * | 10/1986 | Dodge | 524/245 |
| 4,789,568 | A | * | 12/1988 | Matoba et al. | 427/412.1 |
| 4,981,730 | A | * | 1/1991 | Zaleski | 427/393.5 |
| 5,106,889 | A | * | 4/1992 | Hirata et al. | 524/423 |
| 5,207,954 | A | * | 5/1993 | Lewis et al. | 264/13 |
| 5,258,444 | A | * | 11/1993 | Zezinka et al. | 524/501 |
| 6,258,889 | B1 | * | 7/2001 | Mizuguchi et al. | 524/531 |
| 6,447,844 | B1 | * | 9/2002 | Kawano et al. | 427/302 |

FOREIGN PATENT DOCUMENTS

| EP | 325861 | * | 8/1989 |
|---|---|---|---|
| EP | 774500 | * | 5/1997 |
| WO | WO 93/03104 | * | 2/1993 |

* cited by examiner

*Primary Examiner*—Callie Shosho
(74) *Attorney, Agent, or Firm*—Haugen Law Firm PLLP

(57) ABSTRACT

The present invention provides a coating composition for automotive upholstery, with which a 1-coat finish of not yet surface-treated (pretreated) plastic materials such as polyolefin materials can be performed, and which is aqueous, and excellent also in chemical resistance. The aqueous coating composition for automotive upholstery comprises a resin emulsion as an essential component, wherein the resin emulsion includes poly(olefin chloride) resin emulsion A and pure acrylic resin emulsion B in a weight ratio (A/B) of 25/75~30/70 in terms of solid content, wherein poly(olefin chloride) resin emulsion A is an emulsion of a poly(olefin chloride) resin having a chlorine content of 22~25 wt % in terms of solid content and a weight-average molecular weight of 60,000~80,000, and wherein pure acrylic resin emulsion B is an emulsion of a pure acrylic resin having a glass transition temperature of not lower than 40° C.

8 Claims, No Drawings

AQUEOUS COATING COMPOSITION FOR AUTOMOTIVE UPHOLSTERY

BACKGROUND OF THE INVENTION

A. Technical Field

The present invention relates to an aqueous coating composition for automotive upholstery, which has excellent coatability to plastic materials, particularly, polyolefin materials.

B. Background Art

As to plastic materials utilized for automotive upholstery, various ones are selected from among such as polypropylene (PP), acrylonitrile-styrene (AS), acrylonitrile-butadiene-styrene (ABS), poly(phenylene oxide) (PPO), poly(vinyl chloride) (PVC), polyurethane (PU) and polycarbonate (PC) in accordance with physical properties demanded to product specifications. In recent years, however, polyolefin materials having excellent recyclability are getting often used in view of environmental protection.

Coatings suitable for upholstery are applied to these plastic materials. However, it is difficult to make the resultant coating films adhere to the polyolefin materials, because the polyolefin materials have low surface activity and are crystalline.

Therefore, a pretreatment to ensure the adhesion, such as plasma treatment and flame treatment, is made. Consequently, the coating process becomes complicated, and this pretreatment is a cause of an increase in costs.

In addition, in order to improve the coatability to the polyolefin, a coating composition is generally allowed to contain a poly(olefin chloride) resin to be a solvent type coating composition in which the poly(olefin chloride) resin is dissolved in an organic solvent. However, when such a solvent type coating composition is stored or handled, not only are there problems of environmental deterioration (such as destruction of ozone layer and occurrence of photochemical smog), but also there are anxieties about occurrence of fires and bad influence upon human bodies, because the solvent easily volatilizes.

Chemical resistance such as engine oil resistance and grease resistance will be demanded to automotive uses.

SUMMARY OF THE INVENTION

A. Object of the Invention

An object of the present invention is to provide a coating composition for automotive upholstery, with which a 1-coat finish of not yet surface-treated (pretreated) plastic materials such as polyolefin materials can be performed, and which is aqueous, and excellent also in chemical resistance.

B. Disclosure of the Invention

The present inventors made various experiments to solve the above-mentioned problems. As a result, they completed the present invention by verifying that, if an emulsion type is used as the poly(olefin chloride) resin, and if the chlorination degree thereof is adjusted to a specific ratio, and if this poly(olefin chloride) resin is combined with a large amount of emulsion of a pure acrylic resin within the specific ratio range, then the use of the organic solvent can be omitted or diminished, and further, the 1-coat finish of the plastic materials such as polyolefin materials can be performed, and the chemical resistance can also be enhanced.

That is to say, an aqueous coating composition for automotive upholstery, according to the present invention, comprises a resin emulsion as an essential component, wherein the resin emulsion includes poly(olefin chloride) resin emulsion A and pure acrylic resin emulsion B in a weight ratio (A/B) of 25/75~30/70 in terms of solid content, wherein poly(olefin chloride) resin emulsion A is an emulsion of a poly(olefin chloride) resin having a chlorine content of 22~25 wt % in terms of solid content and a weight-average molecular weight of 60,000~80,000, and wherein pure acrylic resin emulsion B is an emulsion of a pure acrylic resin having a glass transition temperature of not lower than 40° C.

When the above aqueous coating composition for automotive upholstery, according to the present invention, is a lacquer paint, it is preferable that the composition further comprises a scaly inorganic powder in a ratio of 60~75 parts by weight per 100 parts by weight of the resin emulsion in terms of solid content.

These and other objects and the advantages of the present invention will be more fully apparent from the following detailed disclosure.

DETAILED DESCRIPTION OF THE INVENTION (Aqueous Coating Composition)

The aqueous coating composition for automotive upholstery, according to the present invention, comprises a resin emulsion as an essential component, wherein the resin emulsion includes poly(olefin chloride) resin emulsion A and pure acrylic resin emulsion B. The total ratio of these two kinds of resin emulsions is preferably in the range of 15~30 wt %, in terms of solid content, of the entirety of the coating composition.

In the present invention, usually, the poly(olefin chloride) resin and the pure acrylic resin are emulsified separately from each other, and then mixed together.

As to the above resin emulsion, the poly(olefin chloride) resin or pure acrylic resin is particulately dispersed in an aqueous medium, and the particle surfaces thereof are stabilized with such as emulsifiers, surfactants, or dispersants.

(Poly(olefin chloride) resin)

The poly(olefin chloride) resin gives the coating composition sufficient coatability to polyolefin materials, because the polyolefin has affinity for plastic materials to be coated therewith, particularly, polyolefin materials, and further because the polyolefin is polarized by chlorination to enhance its film formability.

Examples of the polyolefin include: homopolymers of such as ethylene and propylene; random copolymers or block copolymers obtained by copolymerizing two or more monomers such as olefin monomers (e.g. ethylene, propylene, 1-butene, 1-pentene, 1-heptene and 1-octene) and vinyl monomers having a terminal vinyl group (e.g. vinyl alkyl ethers, vinyl chloride and vinyl acetate); hydrogenated products from copolymers of such as styrene, butadiene, isoprene and dicyclopentadiene. These may be used either alone respectively or in combinations with each other. Although not especially limited, polypropylene is preferable because it is easily available and has high adhesion.

It is necessary that the poly(olefin chloride) has a weight-average molecular weight in the range of 60,000~80,000. In the case where the weight-average molecular weight is less than the above range, swelling with engine oil easily occurs, therefore the engine oil resistance is low. In the case where the weight-average molecular weight is more than the above range, the viscosity becomes high in the emulsifying step, therefore the emulsification is difficult, and further, the storage stability is also bad.

It is necessary that the poly(olefin chloride) has a chlorine content of 22~25 wt % in terms of solid content. In the case where the chlorine content is less than the above range, the affinity and the compatibility between the poly(olefin chloride) and the pure acrylic resin are both so poor that it is difficult to obtain a uniform coating film. On the other hand, in the case where the chlorine content is more than the above range, the adhesion to polyolefin materials is inferior.

In the present invention, the poly(olefin chloride) may be modified (grafted) with an unsaturated polycarboxylic acid and/or an acid anhydride thereof, because the compatibility between the poly(olefin chloride) and the pure acrylic resin is thereby improved to enhance the water dispersibility. If the poly(olefin chloride) is modified with the acid anhydride and/or carboxylic acid, then the acid anhydride group and/or carboxyl group thereof is in the form of a free radical and/or reacts with a basic substance to form a carboxylate anion, with the result that the water solubility is displayed. Therefore, the modified poly(olefin chloride) is easily emulsified and has high water dispersibility. As a result, the storage stability of the aqueous coating composition is enhanced.

Examples of the unsaturated acid anhydride and/or carboxylic acid include maleic acid, fumaric acid, maleic anhydride, citraconic acid, citraconic anhydride, itaconic acid and itaconic anhydride. These may be used either alone respectively or in combinations with each other. Although not especially limited, maleic acid and maleic anhydride are preferable because they are easily available.

(Pure acrylic resin)

Because the above poly(olefin chloride) has a low level of coating film strength and weather resistance, the pure acrylic resin used in the present invention is a component to make up for this and to give the present invention aqueous coating composition the engine oil resistance, the contamination resistance, and the solvent resistance along with the coating film strength and the weather resistance.

The pure acrylic resin is a resin obtained by homopolymerizing or copolymerizing acrylic monomers such as (meth)acrylic acid, (meth)acrylic monomers containing a hydroxyl group, (meth)acrylic acid esters and (meth)acrylonitrile. In short, the pure acrylic resin is a styrene-free acrylic resin. The reason therefor is that styrene deteriorates the engine oil resistance because the solvent resistance of styrene is inferior.

Specifically, the pure acrylic resin is obtained by homopolymerizing or copolymerizing acrylic monomers containing a hydroxyl group, a carboxyl group, or an ester group. Examples of the acrylic monomer containing a hydroxyl group include 2-hydroxyethyl (meth)acrylate, 3-hydroxypropyl (meth)acrylate, 4-hydroxybutyl (meth)acrylate, and ε-caprolactone adducts thereof. Examples of the acrylic monomer containing a carboxyl group include (meth)acrylic acid. Examples of the acrylic monomer containing an ester group include methyl (meth)acrylate, ethyl (meth)acrylate, butyl (meth)acrylate, isobutyl (meth)acrylate, and lauryl (meth)acrylate.

It is necessary that the pure acrylic resin has a glass transition temperature (Tg) of not lower than 40° C. In the case where the glass transition temperature of the pure acrylic resin is lower than 40° C., coating film hardness sufficient for automotive upholstery is not obtained, therefore the scratch resistance is not satisfactory. Hereupon, the glass transition temperature is a value determined by the plastic transition temperature measurement method according to JIS-K-7121.

(Emulsification)

The poly(olefin chloride) resin or pure acrylic resin has so high hydrophobicity as to be difficult to stably disperse into water. Thus, the poly(olefin chloride) resin is emulsified with an emulsifier or basic substance.

The combining ratio of the emulsifier is fitly set in accordance with the combining ratio of the poly(olefin chloride) resin, the pure acrylic resin, the basic substance, or water, but, for example, in the case of the poly(olefin chloride) resin, the combining ratio of the emulsifier is preferably in the range of 3~40 parts by weight, more preferably 10~25 parts by weight, per 100 parts by weight of the resin. In the case where the ratio of the emulsifier is less than 3 parts by weight, the storage stability of the emulsion is low, and further, the aggregation or precipitation easily occurs on the way of polymerization in the below-mentioned production process for the emulsion. On the other hand, in the case where the ratio of the emulsifier is more than 40 parts by weight, a large amount of emulsifier remains in the coating film, with the result that the water resistance or weather resistance of the coating film is deteriorated.

The emulsifier is not especially limited, but examples thereof include: nonionic emulsifiers such as polyoxyethylene alkyl ethers, polyoxyethylene alkyl phenol ethers, polyoxyethylene aliphatic esters, polyoxyethylene polyhydric alcohol fatty acid esters, polyhydric alcohol fatty acid esters, polyoxyethylene propylene polyols, and alkylolamides; anionic emulsifiers such as alkylsulfate ester salts, alkylphenolsulfonic acid salts, and sulfosuccinic acid esters; amphoteric emulsifiers such as alkylbetaines and alkylimidazolines; resin type emulsifiers such as polyoxyethylene-group-containing urethane resins and carboxylate-salt-group-containing urethane resins; and cationic emulsifiers such as imidazoline laurate, lauryltrimethylammonium chloride, stearylbetaine, and distearyldimethylammonium chloride. These may be used either alone respectively or in combinations with each other. Among these, the nonionic emulsifiers are preferable, because they have no ionic polar group of high hydrophilicity and therefore make the water resistance of the coating film good.

As to the emulsifier, reactive emulsifiers are also usable besides the above-mentioned non-reactive emulsifiers. The joint use of the reactive emulsifier with the non-reactive emulsifier enhances the water resistance of the coating film. The reactive emulsifier, for example, contains a reactive group, such as radical-polymerizable unsaturated bond, as well as a hydrophilic group (e.g. polyethylene oxide group, hydroxyl group, carboxyl group, sulfonic acid group, sulfuric acid group, amino group) and a hydrophobic group (e.g. alkyl group, phenyl group, fluoroalkyl group, polysiloxane group). Examples of the reactive emulsifier include: Adeka Reasoap NE-10, NE-20, NE-30 having an allyl ether group, a polyethylene oxide group and a nonylphenyl group (made by Asahi Denka Kogyo K.K.); SE-10N having an allyl ether group, a polyethylene oxide group, a sulfuric acid group and a nonylphenyl group (made by Asahi Denka Kogyo K.K.); NOIGEN RN-20, RN-30, RN-50 having a propenyl group on a phenyl group in a polyoxyethylene nonyl phenyl ether group (made by Dai-ichi Kogyo Seiyaku Co., Ltd.); HS-10, HS-20 having a propenyl group on a phenyl group in a polyoxyethylene nonyl phenyl ether sulfate ester group (made by Dai-ichi Kogyo Seiyaku Co., Ltd.); S-120A, S-180A having an allyl group and a sulfonic acid group (made by Kao Corporation); and compounds having a methacryloyl group or acryloyl group (made by NIPPON NYUKAZAI Co., Ltd.), such as Antox MS-60

(=bis(polyoxyethylene polycyclic phenyl ether) methacrylate sulfate ester salt), RMA-564, RMA-568, RMA-506 (=polyoxyethylene nonyl phenyl ether acrylates), RMA-1120, MPG130-MA (=polyoxyethylene alkyl ether methacrylates), and MA-30, MA-50, MA-100 (=polyoxyethylene methacrylate esters). These may be used either alone respectively or in combinations with each other. Among these, the reactive emulsifiers having a methacryloyl group or acryloyl group are preferable because they are easily copolymerizable with acrylic monomers in the below-mentioned production process for the emulsion composition.

The combining ratio of the basic substance, used as a neutralizer, is also adjusted in accordance with the combining ratio of the poly(olefin chloride) resin, the pure acrylic resin, the emulsifier, or water. Particularly, the combining ratio of the basic substance is determined in consideration of sufficiently neutralizing an acidic functional group in such as poly(olefin chloride) resin or emulsifier, but is, for example, in the range of 0.1~5 weight % of the entirety of the emulsion. The pH of the emulsion, determined by combining the basic substance, is preferably in the range of 7~11, more preferably 7.5~10.5, most preferably 8~10. In the case where the pH of the emulsion is less than 7, the neutralization is not sufficient, therefore the storage stability of the emulsion might be low. On the other hand, in the case where the pH of the emulsion is more than 11, an excess of free basic substance exists in the emulsion, therefore the emulsion has so strong a smell of amine as to be difficult to use.

The basic substance, used in the present invention, adds to the acid anhydride group and/or carboxyl group of the poly(olefin chloride) resin, and/or neutralizes these groups, thereby serving to enhance the hydrophilicity of the modified poly(olefin chloride) and, as a result, to improve the storage stability of the emulsion.

The basic substance is not especially limited, but examples thereof include at least one of an amine compound and ammonia. Examples of the amine compound include: monoamines such as trimethylamine, triethylamine, butylamine, dibutylamine and N-methylmorpholine; polyamines such as ethylenediamine, hexamethylenediamine, piperazine, isophoronediamine, triethylenediamine and diethylenetriamine; and alkanolamines such as monoethanolamine, diethanolamine, triethanolamine, N-methyldiethanolamine, N,N-dimethylethanolamine and 2-amino-2-methylpropanol. These may be used either alone respectively or in combinations with each other. These may be jointly used with ammonia.

The combining ratio of water is preferably in the range of 50~95 weight %, more preferably 60~85 weight %, most preferably 65~80 weight %, of the entirety of the emulsion. In the case where the combining ratio of water is less than 50 weight %, the nonvolatile solid content in the emulsion is too much, therefore the storage stability of the emulsion might be deteriorated due to easy occurrence of such as aggregation. On the other hand, in the case where the combining ratio of water is more than 95 weight %, the workability is bad in the below-mentioned production process for the emulsion, and further, when the emulsion is for example used for a coating such as aqueous primer coating composition or for ink, the amount of the poly(olefin chloride) resin which is a main component is relatively small, therefore no sufficient performance is obtained.

The average particle diameter of polymer particles including a major proportion of poly(olefin chloride) resin or pure acrylic resin in the emulsion is not especially limited, but is preferably in the range of 0.01~10 μm, more preferably 0.03~5 μm, most preferably 0.05~1 μm. In the case where the average particle diameter of the polymer particles is smaller than 0.01 μm, a large quantity of emulsifier is necessary, therefore the water resistance and the weather resistance of the coating film are deteriorated. On the other hand, in the case where the average particle diameter of the polymer particles is larger than 10 μm, the storage stability of the emulsion is deteriorated, and further, the volume of the polymer particles is too large, therefore much melting heat and time to form a coating film is necessary, and the heat flowability is deteriorated, and, when for example used for a coating such as aqueous primer coating composition, the properties of the coating film such as appearance, water resistance and solvent resistance might be deteriorated.

(Combining ratio between emulsions A and B):

The combining ratio (A/B) between poly(olefin chloride) resin emulsion A and pure acrylic resin emulsion B is in the range of 25/75~30/70 in terms of solid content by weight. In the case where this combining ratio (A/B) is less than 25/75, the amount of the poly(olefin chloride) is too small, therefore the adhesion to materials is insufficient. In the case where this combining ratio (A/B) is more than 30/70, the amount of the pure acrylic resin is too small, therefore the chemical resistance such as engine oil resistance is insufficient.

(Lacquer Paint)

When the coating composition according to the present invention is a lacquer paint, this composition usually further comprises a scaly inorganic powder such as talc, mica, or aluminum flake. The combining ratio of the scaly inorganic powder is preferably in the range of 60~75 parts by weight per 100 parts by weight of the resin emulsion in terms of solid content. In the case where the combining ratio of the scaly inorganic powder is less than 60 parts by weight, contaminators easily intrude, with the result that the chemical resistance such as engine oil resistance tends to be deteriorated. In the case where the combining ratio of the scaly inorganic powder is more than 75 parts by weight, the alkali resistance tends to be deteriorated.

(Other Components)

As to the present invention aqueous coating composition for automotive upholstery, the above essential resin emulsion can fitly be combined with other aqueous resins, if necessary. Water-soluble acrylic resins are the most preferable of the above other aqueous resins, but emulsions of resins other than the water-soluble acrylic resins, such as polyester resin emulsions, polyurethane resin emulsions, epoxy resin emulsions, or amino resin emulsions, may also be combined.

The aqueous coating composition for automotive upholstery, according to the present invention, can further comprise other components which are usually added to coatings, if necessary. Examples thereof include: additives such as surfactants, neutralizers, stabilizers, thickeners, defoamers, surface conditioners, ultraviolet absorbents, and antioxidants; inorganic fillers such as silica; conductive fillers such as conductive carbon, conductive fillers, and metal powders; and auxiliary components such as organic reformers, plasticizers, and additives.

Examples of colorants, which may be mixed into the present invention aqueous coating composition for automotive upholstery, include: inorganic pigments such as titanium oxide, carbon black, iron oxide, chromium oxide, and Prussian blue; organic pigments such as azo pigments, anthracene pigments, perylene pigments, quinacridone pigments, indigo pigments, and phthalocyanine pigments; and dyes.

The aqueous coating composition for automotive upholstery, according to the present invention, can further comprise an organic solvent if the ratio thereof is not more than 20 weight % of water in the resin emulsion. The inclusion of the organic solvent improves the workability and enhances the dispersibility of such as pigments. However, generally, the absence of the organic solvent has more advantage of enhancing the storage stability of the emulsion and fitting with recent restrictions on organic solvents. Examples of such an organic solvent include: aromatic hydrocarbons such as toluene and xylene; aliphatic hydrocarbons such as hexane, heptane and octane; alicyclic hydrocarbons such as cyclohexane, methylcyclohexane and cyclopentane; esters such as ethyl acetate, n-butyl acetate, isobutyl acetate and amyl acetate; ethers such as n-butyl ether and isobutyl ether; ketones such as acetone, methyl ethyl ketone, methyl isobutyl ketone and cyclohexanone; alcohols such as methanol, ethanol, isopropanol, n-butanol, 2-butanol, n-propylene glycol and isopropylene glycol; cellosolves such as ethylene glycol monomethyl ether, ethylene glycol monobutyl ether and ethylene glycol monoethyl ether acetate; carbitols such as diethylene glycol monoethyl ether; propylene glycol monoalkyl ethers such as propylene glycol monomethyl ether, propylene glycol monoethyl ether and propylene glycol monobutyl ether; and other solvents such as dioxane, N-methylpyrrolidone, dimethylformamide and diacetone alcohol.

(Objective Materials)

The plastic material, which is an object to which the present invention aqueous coating composition for automotive upholstery is coated, is not especially limited, but examples thereof include: polyolefins such as polypropylene (PP) and polyethylene (PE); acrylonitrile-styrene (AS), acrylonitrile-butadiene-styrene (ABS), poly(phenylene oxide) (PPO), poly(vinyl chloride) (PVC), polyurethane (PU) and polycarbonate (PC).

(Coating method)

The method for coating the present invention aqueous coating composition onto the plastic material may be performed either by air spray coating or airless spray coating.

The aqueous coating composition is, for example, coated such that the dried-film thickness will be preferably in the range of 10~50 $\mu$m, more preferably 15~25 $\mu$m. In the case where the dried-film thickness is less than 10 $\mu$m, the thickness might be too thin to obtain a uniform film. On the other hand, in the case where the dried-film thickness is more than 50 $\mu$m, there tends to occur problems of such as coating film cracking.

The step of drying the coating film may be carried out at room temperature, but is preferably carried out by heating in the range of 60~80° C. to improve the workability or physical properties.

(Effects and Advantages of the Invention)

The aqueous coating composition for automotive upholstery, according to the present invention, enables a 1-coat finish of not yet surface-treated (pretreated) plastic materials, such as polyolefin materials, to be performed with this aqueous coating composition, and, because of being aqueous, involves none of the environmental deterioration, the occurrence of fires, and the bad influence upon human bodies, and further, is excellent also in chemical resistance, such as engine oil resistance and grease resistance, and is fit for such as lacquer paint.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples. In addition, hereinafter, the units "part(s)" and "%" are by weight.

Poly(olefin chloride) resin emulsion A, used in the Examples and the Comparative Examples, was produced in the following way.

One hundred parts of poly(olefin chloride) resin (nonvolatile content: 100%, chlorine content: 22%, maleation degree: 5%, weight-average molecular weight: 65,000), 40 parts of xylene, and 25 parts of Emulgen 920 (made by Kao Corporation) were placed into a reactor as equipped with stirring vanes, a thermometer, a thermocontrolling rod, and a condenser. The resultant mixture was heated to 80° C., and this temperature was kept for 1 hour. Then, 2 parts of diethylmethylamine (DEMA) and 255 parts of warm water were added dropwise into the reactor over a period of 1 hour, and the resultant reaction mixture was subsequently stirred at 80° C. and then cooled, thus obtaining poly(olefin chloride) resin emulsion A having a nonvolatile content of 30% and an average particle diameter of 0.05~0.1 $\mu$m.

Pure acrylic resin emulsion B, used in the Examples and the Comparative Examples, was produced in the following way.

Sixty-seven parts of n-butyl methacrylate, 21 parts of methyl methacrylate, 2 parts of methacrylic acid, and 14 parts of Emulgen 920 (made by Kao Corporation) were placed into a reactor as equipped with stirring vanes, a thermometer, a thermocontrolling rod, and a condenser. The resultant mixture was heated to 100° C. and then stirred for 30 minutes, thus obtaining a uniform solution. After cooling the solution to 50° C., a solution of 1.5 parts of azobisisobutyronitrile (AIBN) and 10 parts of methyl methacrylate was added to the reactor. Furthermore, 135 parts of ion-exchanged water was dropwise added to the reactor over a period of 30 minutes under stirring at 1,000 rpm, thus preparing an aqueous suspension. This aqueous suspension was re-heated to 85° C. to carry out a reaction at 150 rpm for 3 hours, thus obtaining acrylic emulsion B. This acrylic emulsion B had a nonvolatile content of 45%, an average particle diameter of 0.21 $\mu$m, and a glass transition temperature of 47° C.

The other components used are as follows:

Water-soluble acrylic resin: made by Nippon Paint Co., Ltd., NV=23%, resin acid value=55 KOHmg/g Carbon black: Special Black 4A (DEGUSSA CORP)

Titanium oxide: R-960 (E I DUPONT DE NEMOURS CO)

Silica flatting agent: SILCRON G601 (SCM CHEMICALS AND COLORS)

Surface conditioner: TEGO WET KL 245 (CHIDLEY & PETO COMPANY)

Defoamer: SURFYNOL 104PA (made by Air Products Japan, Inc.)

Film-forming assistant: N-methyl-2-pyrrolidone

Examples 1~2 and Comparative Examples 1~5

Lacquer type aqueous coating compositions were prepared in accordance with the combinations of Table 1. In Table 1, emulsion A is poly(olefin chloride) resin emulsion A, and emulsion B is pure acrylic resin emulsion B.

Lacquer coating processes were carried out as follows: the lacquer type aqueous coating compositions of Examples 1~2 and Comparative Examples 1~5 were air-spray-coated onto surfaces of polypropylene materials and then dried at 80° C. for 30 minutes such that the dried-film thickness would be in the range of 15~20 µm.

The performances of the resultant coating films were evaluated in the below-mentioned way. Results thereof are collectively shown in Table 1.

(Evaluation Method)

Appearance

Such as pinhole, crater and mottle of the dried coating film were evaluated with the eye.

Adhesion

In accordance with the checkerboard squares test method of JIS K5400 (6.15), cuts are made at intervals of 2 mm on the dried coating film, and then a pressure sensitive adhesive tape is stuck onto the cuts, and then an end of the tape is lifted to peel off the tape upward. This peeling-off operation is carried out twice on identical portions. The adhesion is evaluated from the number of squares where the coating film peels off in a ratio of not less than 50% by area. The case where the number was 0 was taken as success, and the case where the number was not smaller than 1 was taken as failure.

Water resistance

The test piece was immersed into a water thermostat of 40° C. for 24 hours, and then got out to evaluate whether abnormality occurred to the coating film or not, and to further evaluate the above-mentioned adhesion. The case where there was no difference in appearance as compared with the initial one and where there was no peeling-off was taken as success.

Engine Oil Resistance and Grease Resistance

A prescribed amount of chemical below was placed on the test piece as horizontally put. Then, the test piece was heated with a thermostat of 80° C. for 2 hours and then got out, and then the surface thereof was wiped with soft cloth containing a neutral detergent. The case where the coating film did not peel off when being scratched with a nail was taken as success. When the engine oil resistance was evaluated, 0.2 ml of engine oil "(trade name) Pure Ultra Oil" of Honda Giken Kogyo Kabushiki Kaisha was coated. When the grease resistance was evaluated, 1 g of superfine lubricating oil "(trade name) Multipurpose Grease" of Honda Access Kabushiki Kaisha was coated into a diameter of 25~30 mm.

Hot Scratchability

The coating film was pealed off by 1 cm in width at an end of a test piece as covered with the coating film, thus preparing a test piece having an end where the surface of the base material was exposed. This test piece was left in an oven of 80° C. for 30 minutes and then got out of the oven. A scratch test tool having a width of 1 mm, an edge angle of 90°, and a load of 1 kg was applied to the coating film surface at an angle of 30° to scratch it at a rate of 50 mm/sec, when whether the coating film peeled off or not was verified. The case where the coating film did not peel off was taken as success, and the case where the coating film peeled off was taken as failure.

TABLE 1

|  | Example 1 | Example 2 | Comparative Example 1 | Comparative Example 2 | Comparative Example 3 | Comparative Example 4 | Comparative Example 5 |
|---|---|---|---|---|---|---|---|
| Composition of coating |  |  |  |  |  |  |  |
| Combination (parts by weight) |  |  |  |  |  |  |  |
| Carbon black | 0.32 | 0.32 | 0.32 | 0.32 | 0.32 | 0.32 | 0.32 |
| Titanium oxide | 3.51 | 3.51 | 3.51 | 3.51 | 3.51 | 3.51 | 3.51 |
| Talc | 13.46 | 13.46 | 13.46 | 13.46 | 13.46 | 13.46 | 13.46 |
| Emulsion A | 5.45 | 4.54 | 3.63 | 6.36 | 7.26 | 4.54 | 4.54 |
| Emulsion B | 12.71 | 13.62 | 14.53 | 11.80 | 10.90 | 13.62 | 13.62 |
| Water-soluble acrylic resin | 0.45 | 0.45 | 0.45 | 0.45 | 0.45 | 0.45 | 0.45 |
| Silica flatting agent | 0.86 | 0.86 | 0.86 | 0.86 | 0.86 | 0.86 | 0.86 |
| Surface conditioner | 0.26 | 0.26 | 0.26 | 0.26 | 0.26 | 0.26 | 0.26 |
| Defoamer | 0.14 | 0.14 | 0.14 | 0.14 | 0.14 | 0.14 | 0.14 |
| Thickener | 0.54 | 0.54 | 0.54 | 0.54 | 0.54 | 0.54 | 0.54 |
| Water | 55.18 | 55.18 | 55.18 | 55.18 | 55.18 | 55.18 | 55.18 |
| Film-forming assistant | 7.12 | 7.12 | 7.12 | 7.12 | 7.12 | 7.12 | 7.12 |
| Total | 100 | 100 | 100 | 100 | 100 | 100 | 100 |
| Weight ratio between emulsions A and B | 30/10 | 25/75 | 20/80 | 35/65 | 40/60 | 25/75 | 25/75 |
| Tg of emulsion B | 47° C. | 47° C. | 47° C. | 47° C. | 47° C. | 27° C. | 38° C. |
| Weight of talc (per 100 parts by weight of resin) | 74 | 74 | 74 | 74 | 74 | 74 | 74 |
| Evaluation |  |  |  |  |  |  |  |
| Hot scratchability | Success | Success | — | Success | Success | Failure | Failure |
| Adhesion | Success (0) | Success (0) | Failure (10) | Success (0) | Success (0) | Failure (1) | Failure Peeled off outside the squares |
| Water resistance |  |  |  |  |  |  |  |
| Appearance | Success | Success | Success | Success | Success | Success | Success |
| Adhesion | Success (0) | Success (0) | Failure (10) | Success (0) | Success (0) | Failure (10) | Failure Peeled off outside the squares |
| Engine oil resistance | Success | Success | Success | Failure | Failure | Success | Success |
| Grease resistance | Success | Success | Success | Failure | Failure | Success | Success |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous coating composition for automotive plastic upholstery, comprising:
   a) a resin emulsion C as an essential component,
   b) wherein the resin emulsion C comprises maleated poly (olefin chloride) resin emulsion A and pure acrylic resin emulsion B in a weight ratio (A/B) of 25/75–30/70 in terms of solid content;
   c) wherein the maleated poly (olefin chloride) resin emulsion A is an emulsion of a maleated poly (olefin chloride) resin having a chlorine content of 22–25 wt % in terms of solid content and a weight-average molecular weight of 60,000–80,000;
   d) wherein the maleated poly (olefin chloride) resin emulsion A comprises an emulsifier, wherein the emulsifier is in the range of 3 to 40 parts by weight of the maleated poly (olefin chloride) resin;
   e) wherein pure acrylic resin emulsion B is an emulsion of a pure acrylic resin having a glass transition temperature of not lower than 40° C.;
   f) wherein said pure acrylic resin is a styrene-free acrylic resin;
   g) wherein the resin emulsion C includes polymer particles of the maleated poly (olefin chloride) resin and polymer particles of the pure acrylic resin and wherein an average particle diameter of the polymer particles is in the range of 0.01 to 10 μm; and
   h) wherein the maleated poly(olefin chloride) resin of the maleated poly(olefin chloride) polymer particle is free of styrene.

2. An aqueous coating composition for automotive plastic upholstery according to claim 1, which is a lacquer paint and further comprises a scaly inorganic powder in a ratio of 60–75 parts by weight per 100 parts by weight of the resin emulsion in terms of solid content.

3. A coating process for automotive upholstery having a plastic base material, comprising the steps of:
   a) coating an aqueous coating composition onto the plastic base material of the automotive upholstery;
   b) drying the resultant coating at 60 to 80° C., wherein the resultant coating that has dried has a thickness of 10 to 50 μm;
   c) wherein the aqueous coating composition comprises:
      i) a resin emulsion C as an essential component,
      ii) wherein the resin emulsion C comprises maleated poly (olefin chloride) resin emulsion A and pure acrylic resin emulsion B in a weight ratio (A/B) of 25/75–30/70 in terms of solid content;
      iii) wherein the maleated poly (olefin chloride) resin emulsion A is an emulsion of a maleated poly (olefin chloride) resin having a chlorine content of 22–25 wt % in terms of solid content and a weight-average molecular weight of 60,000–80,000;
      iv) wherein the maleated poly (olefin chloride) resin emulsion A comprises an emulsifier, wherein the emulsifier is in the range of 3 to 40 parts by weight of the maleated poly (olefin chloride) resin;
      v) wherein pure acrylic resin emulsion B is an emulsion of a pure acrylic resin having a glass transition temperature of not lower than 40° C.;
      vi) wherein said pure acrylic resin is a styrene-free acrylic resin; and
      vii) wherein the resin emulsion C includes polymer particles of the maleated poly (olefin chloride) resin and polymer particles of the pure acrylic resin and wherein an average particle diameter of the polymer particles is in the range of 0.01 to 10 μm; and
   d) selecting maleated poly(olefin chloride) resin that is free of styrene for the maleated poly(olefin chloride) resin of the maleated poly(olefin chloride) polymer particle.

4. Automotive upholstery, comprising:
   a) a plastic base material;
   b) a coating film on the plastic base material;
   c) wherein the coating film is formed on the plastic base material by a process including the steps of:
      i) coating an aqueous coating composition onto the plastic base material of the automotive upholstery;
      ii) drying the resultant coating at 60 to 80° C., wherein the resultant coating that has dried has a thickness of 10 to 50 μm; and
      iii) wherein the aqueous coating composition comprises:
         A) a resin emulsion C as an essential component,
         B) wherein the resin emulsion C comprises maleated poly (olefin chloride) resin emulsion A and pure acrylic resin emulsion B in a weight ratio (A/B) of 25/75–30/70 in terms of solid content;
         C) wherein the maleated poly (olefin chloride) resin emulsion A is an emulsion of a maleated poly (olefin chloride) resin having a chlorine content of 22–25 wt % in terms of solid content and a weight-average molecular weight of 60,000–80,000;
         D) wherein the maleated poly (olefin chloride) resin emulsion A comprises an emulsifier, wherein the emulsifier is in the range of 3 to 40 parts by weight of the maleated poly (olefin chloride) resin;
         E) wherein pure acrylic resin emulsion B is an emulsion of a pure acrylic resin having a glass transition temperature of not lower than 40° C.;
         F) wherein said pure acrylic resin is a styrene-free acrylic resin;
         G) wherein the resin emulsion C includes polymer particles of the maleated poly (olefin chloride) resin and polymer particles of the pure acrylic resin and wherein an average particle diameter of the polymer particles is in the range of 0.01 to 10 μm; and
         H) wherein the maleated poly(olefin chloride) resin of the maleated poly(olefin chloride) polymer particle is free of styrene.

5. An aqueous coating composition for automotive plastic upholstery, comprising:
   a) a resin emulsion C as an essential component,
   b) wherein the resin emulsion C comprises maleated poly (olefin chloride) resin emulsion A and pure acrylic resin emulsion B in a weight ratio (A/B) of 25/75–30/70 in terms of solid content;
   c) wherein the maleated poly (olefin chloride) resin emulsion A is an emulsion of a maleated poly (olefin chloride) resin having a chlorine content of 22–25 wt % in terms of solid content and a weight-average molecular weight of 60,000–80,000;
   d) wherein the maleated poly (olefin chloride) resin emulsion A comprises an emulsifier, wherein the emulsifier is in the range of 3 to 40 parts by weight of the maleated poly (olefin chloride) resin;

e) wherein pure acrylic resin emulsion B is an emulsion of a pure acrylic resin having a glass transition temperature of not lower than 40° C.;

f) wherein said pure acrylic resin is a styrene-free acrylic resin;

g) wherein the resin emulsion C includes polymer particles of the maleated poly (olefin chloride) resin and polymer particles of the pure acrylic resin and wherein an average particle diameter of the polymer particles is in the range of 0.01 to 10 μm; and h) wherein the poly(olefin chloride) resin of the maleated poly(olefin chloride) resin is grafted only with maleic acid or maleic anhydride.

6. An aqueous coating composition for automotive plastic upholstery according to claim 5, which is a lacquer paint and further comprises a scaly inorganic powder in a ratio of 60–75 parts by weight per 100 parts by weight of the resin emulsion in terms of solid content.

7. A coating process for automotive upholstery having a plastic base material, comprising the steps of:

a) coating an aqueous coating composition onto the plastic base material of the automotive upholstery;

b) drying the resultant coating at 60 to 80° C., wherein the resultant coating that has dried has a thickness of 10 to 50 μm;

c) wherein the aqueous coating composition comprises:
  i) a resin emulsion C as an essential component,
  ii) wherein the resin emulsion C comprises maleated poly (olefin chloride) resin emulsion A and pure acrylic resin emulsion B in a weight ratio (A/B) of 25/75–30/70 in terms of solid content;
  iii) wherein the maleated poly (olefin chloride) resin emulsion A is an emulsion of a maleated poly (olefin chloride) resin having a chlorine content of 22–25 wt % in terms of solid content and a weight-average molecular weight of 60,000–80,000;
  iv) wherein the maleated poly (olefin chloride) resin emulsion A comprises an emulsifier, wherein the emulsifier is in the range of 3 to 40 parts by weight of the maleated poly (olefin chloride) resin;
  v) wherein pure acrylic resin emulsion B is an emulsion of a pure acrylic resin having a glass transition temperature of not lower than 40° C.;
  vi) wherein said pure acrylic resin is a styrene-free acrylic resin; and
  vii) wherein the resin emulsion C includes polymer particles of the maleated poly (olefin chloride) resin and polymer particles of the pure acrylic resin and wherein an average particle diameter of the polymer particles is in the range of 0.01 to 10 μm; and d) selecting only maleic acid or maleic anhydride as a graft for the poly(olefin chloride) resin of the maleated poly(olefin chloride) resin.

8. Automotive upholstery, comprising:

a) a plastic base material;

b) a coating film on the plastic base material;

c) wherein the coating film is formed on the plastic base material by a process including the steps of:
  i) coating an aqueous coating composition onto the plastic base material of the automotive upholstery;
  ii) drying the resultant coating at 60 to 80° C., wherein the resultant coating that has dried has a thickness of 10 to 50 μm; and
  iii) wherein the aqueous coating composition comprises:
    A) a resin emulsion C as an essential component,
    B) wherein the resin emulsion C comprises maleated poly (olefin chloride) resin emulsion A and pure acrylic resin emulsion B in a weight ratio (A/B) of 25/75–30/70 in terms of solid content;
    C) wherein the maleated poly (olefin chloride) resin emulsion A is an emulsion of a maleated poly (olefin chloride) resin having a chlorine content of 22–25 wt % in terms of solid content and a weight-average molecular weight of 60,000–80,000;
    D) wherein the maleated poly (olefin chloride) resin emulsion A comprises an emulsifier, wherein the emulsifier is in the range of 3 to 40 parts by weight of the maleated poly (olefin chloride) resin;
    E) wherein pure acrylic resin emulsion B is an emulsion of a pure acrylic resin having a glass transition temperature of not lower than 40° C.;
    F) wherein said pure acrylic resin is a styrene-free acrylic resin;
    G) wherein the resin emulsion C includes polymer particles of the maleated poly (olefin chloride) resin and polymer particles of the pure acrylic resin and wherein an average particle diameter of the polymer particles is in the range of 0.01 to 10 μm; and
    H) wherein the poly(olefin chloride) resin of the maleated poly(olefin chloride) resin is grafted only with maleic acid or maleic anhydride.

* * * * *